United States Patent
Zhang et al.

(10) Patent No.: US 10,235,231 B2
(45) Date of Patent: Mar. 19, 2019

(54) ANOMALY FUSION ON TEMPORAL CASUALTY GRAPHS

(71) Applicant: NEC Laboratories America, Inc., Princeton, NJ (US)

(72) Inventors: Kai Zhang, Monmouth Junction, NJ (US); Jianwu Xu, Lawrenceville, NJ (US); Hui Zhang, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 113 days.

(21) Appl. No.: 15/351,449

(22) Filed: Nov. 15, 2016

(65) Prior Publication Data

US 2017/0235626 A1    Aug. 17, 2017

Related U.S. Application Data

(60) Provisional application No. 62/256,752, filed on Nov. 18, 2015.

(51) Int. Cl.
| | |
|---|---|
| *G06N 5/04* | (2006.01) |
| *G06N 7/00* | (2006.01) |
| *G06F 11/07* | (2006.01) |
| *G06F 11/34* | (2006.01) |

(52) U.S. Cl.
CPC ...... *G06F 11/0775* (2013.01); *G06F 11/0709* (2013.01); *G06F 11/079* (2013.01); *G06F 11/0751* (2013.01); *G06F 11/3452* (2013.01); *G06N 5/04* (2013.01); *G06N 7/00* (2013.01); *G06F 2201/83* (2013.01); *G06F 2201/86* (2013.01)

(58) Field of Classification Search
CPC ............ G06F 11/079; G06F 11/0709; G06F 11/0751; G06F 11/0775; G06F 11/3452; G06N 5/04; G06N 7/00
See application file for complete search history.

(56) References Cited

U.S. PATENT DOCUMENTS

| | | | |
|---|---|---|---|
| 8,370,609 B1 * | 2/2013 | Favor | G06F 9/3808 712/225 |
| 2010/0161307 A1 * | 6/2010 | Bharadwaj | G06F 11/3664 703/21 |
| 2011/0112998 A1 * | 5/2011 | Abe | G06N 5/003 706/13 |

(Continued)

OTHER PUBLICATIONS

Arnold, A., Liu, Y., & Abe, N. (Aug. 2007). Temporal causal modeling with graphical granger methods. In Proceedings of the 13th ACM SIGKDD international conference on Knowledge discovery and data mining (pp. 66-75). ACM.*

*Primary Examiner* — Paul Contino
(74) *Attorney, Agent, or Firm* — Joseph Kolodka

(57) ABSTRACT

An exemplary method for detecting one or more anomalies in a system includes building a temporal causality graph describing functional relationship among local components in normal period; applying the causality graph as a propagation template to predict a system status by iteratively applying current system event signatures; and detecting the one or more anomalies of the system by examining related patterns on the template causality graph that specifies normal system behaviors. The system can align event patterns on the causality graph to determine an anomaly score.

13 Claims, 4 Drawing Sheets

(56) References Cited

U.S. PATENT DOCUMENTS

| | | | |
|---|---|---|---|
| 2014/0108324 A1* | 4/2014 | Chen | G06F 17/18 706/52 |
| 2014/0245443 A1 | 8/2014 | Chakraborty | |
| 2014/0279797 A1* | 9/2014 | Dang | G06N 5/025 706/47 |
| 2015/0106324 A1* | 4/2015 | Puri | G06N 5/04 706/52 |
| 2015/0269491 A1 | 9/2015 | Tripathi et al. | |

* cited by examiner

ANOMALY FUSION ON TEMPORAL CASUALTY GRAPHS

The present invention claims priority from Provisional Ser. 62/256,752 filed Nov. 18, 2106, the content of which is incorporated by reference.

BACKGROUND

With the development on the scale and functionality of large networked systems such as the digital networking systems (DNS) and clouds, the complexity of system increases significantly, making it more and more important to detect system anomalies or failures in a proactive and reliable manner. This can greatly reduce the risk of disrupting system services which is usually associated with huge economical loss. In order to keep track of the global system conditions, a monitoring system is usually deployed that records the running status of important local components/modules/sub-systems. To perform failure or anomaly detection, one method detects anomalies in noisy multi-variate time series data by employing a sparse temporal event regression method to capture the dependence relationships among variables in the time series. Anomalies are found by performing a random walk traversal on the graph induced by the temporal event regression. Another method makes the fault detector available as a service to applications.

Generally, such a system is composed of several failure detection agents running inside a distributed environment, each being responsible for the monitoring of a subset of processes and the update of the applications.

Adaptive protocols can be used for anomaly detection. These protocols adapt dynamically to their environmental and, in particular, adapt their behavior to changing network conditions. These adaptive approaches typically require domain knowledge of the distributed systems as well as some interference with the system (such as the response of certain test signals in order to check whether the system is running normally).

A family of related algorithms is causal inference particularly based on the sparse granger causality method. The typical approach in this family of algorithms is to use auto-regressive (VAR) models to compute the relation between multiple time series. In order to make the connections sparse, an L1-norm regularization is added such that only a small subset of causal relations will be identified as significant ones. Other methods are used where the causal structure is determined purely from statistical tests. These methods only focus on identifying the temporal causality relation in the whole system, however, they do not consider the problem of further identifying anomalies in the system.

SUMMARY

An exemplary method for detecting one or more anomalies in a system includes building a temporal causality graph describing functional relationship among local components in normal period; applying the causality graph as a propagation template to predict a system status by iteratively applying current system event signatures; and detecting the one or more anomalies of the system by examining related patterns on the template causality graph that specifies normal system behaviors. The system can align event patterns on the causality graph to advantageously determine an anomaly score.

In illustrative implementations, sensors can be used as part of an internet of things (IoT), digital networking system or cloud and the system can detect anomalies from sensor data. The system can detect potential anomalies of the system by examining the related patterns on a template causality graph that specifies normal system behaviors. The system can determine an anomaly score by using this predicted system event. The system can process signatures on the temporal causality graph, and examine how different patterns in this signature are from the temporal causality graph.

Advantages of the system may include one or more of the following. The system provides anomaly and failure detection in big networking systems, such as digital networking system or clouds. The system can detect anomalies, suspicious behaviors, or serious failures in large networking systems. This allows the system operators to maintain the system more effectively so that when potential disruption of normal system running status would happen, proactive debugging or adjustment can be pursued. This can greatly reduce the economical loss compared with unexpected system shutdown or service disruption, which will be valuable in large distributed computer networking systems such as DNS or cloud systems or IoT systems.

DESCRIPTION

Figure 1:
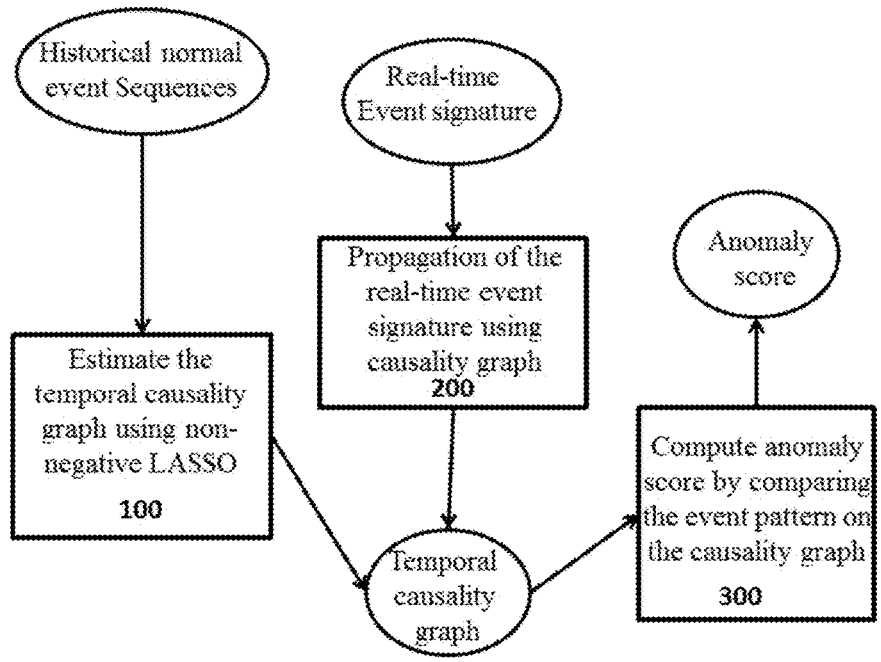
FIG. 1 shows architecture of one exemplary method to detect anomalies, suspicious behaviors, or serious failures in big networking systems.

FIG. 1 shows our architecture of one exemplary method to detect anomalies, suspicious behaviors, or serious failures in big networking systems. There are three major components: (1) a causality inference step 100, which applies the non-negative LASSO regression technique to build the temporal causality graph that summarizes the cause and effect event patterns in the normal running period; (2) an event propagation step 200, which predicts the expected event signatures after a designated steps of time intervals from the current time stamp; (3) an anomaly score quantization step 300, which computes an anomaly score for every time point represented by an event signature vector, by comparing this vector on the temporal causality graph to measure the level of anomaly based on historical observations.

Figure 2:
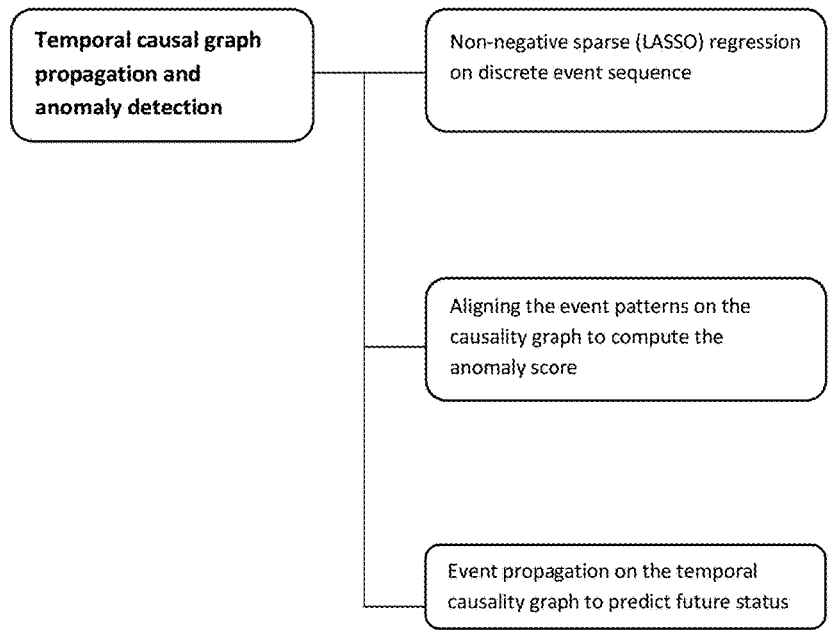
FIG. 2 shows an exemplary method for detecting one or more anomalies in a system.

FIG. 2 shows an exemplary method for detecting one or more anomalies in a system by building a temporal causality graph describing functional relationship among local components in normal period; applying the causality graph as a propagation template to predict a system status by iteratively applying current system event signatures; and detecting the one or more anomalies of the system by examining related patterns on the template causality graph that specifies normal system behaviors. The system can align event patterns on the causality graph to determine an anomaly score. The system can also performing event propagation on the temporal causality graph to predict a future status.

Our procedures for building causality graph and then quantifying anomalies by comparing patterns on the graph, differ from traditional methods that typically consider anomaly detection in a Euclidean vector space. In contrast, the present system uses a graph to describe normal system behaviors and then detect anomaly based on this causal graph as a template. In particular, the graph is computed using non-negative LASSO (least absolute shrinkage and selection operator); while traditional methods for estimating the causality relation is typically based on the standard LAASO method, which could lead to negative coefficients that are not easy to interpret. While traditional methods typically consider continuous time series in causal inference, the present system analyzes discrete event sequences.

In statistics and machine learning, LASSO is a regression analysis method that performs both variable selection and regularization in order to enhance the prediction accuracy and interpretability of the statistical model it produces. LASSO is closely related to basis pursuit denoising. As is known and will be readily appreciated, Lasso was originally formulated for least squares models and this simple case reveals a substantial amount about the behavior of the estimator, including its relationship to ridge regression and best subset selection and the connections between lasso coefficient estimates and so-called soft thresholding. It also reveals that (like standard linear regression) the coefficient estimates need not be unique if covariates are collinear. Though originally defined for least squares, lasso regularization can be applied with a wide variety of statistical models including generalized linear models, generalized estimating equations, proportional hazards models, and M-estimators. Lasso's ability to perform subset selection relies on the form of the constraint and has a variety of interpretations including in terms of geometry, Bayesian statistics, and convex analysis.

The combination of causal inference and anomaly detection is used to identify system failures; and the improved causal inference can handle discrete event sequences with tunable time lags.

Figure 3:
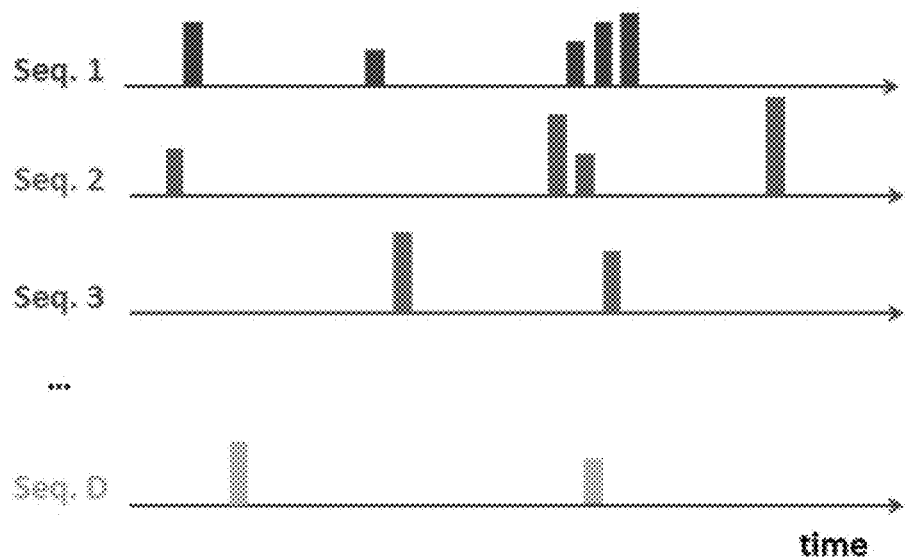
FIG. 3 shows an example of the input multiple event sequences.

FIG. 3 shows an example of our input multiple event sequences. With a number of D sequences, each describing the occurrence of a certain type of anomaly event over time. FIG. 3 illustrates such data format. In one example, each sequence (or type of event) is associated with the burst of anomaly logs in one server in a corporate network system. The ith sequence will be represented by $$S^{(i)} = \{(t_1^{(i)}, e_1^{(i)}), ((t_2^{(i)}, e_2^{(i)}), \ldots, ((t_{n_i}^{(i)}, e_{n_i}^{(i)})\} \quad (1)$$

where t(i)_j is the time stamp of the jth occurrence of event i.e. e(i)_j is the corresponding strength of the occurrence, and ni is the number of occurrences recorded for the ith event. The higher the e(i)_j, the more likely that the ith server undergoes some anomaly status based on the monitoring log analysis.

In the following we will detail our system on anomaly detection and early warning in large networked systems. Our system provides two operations. First, we will build a temporal causality graph which describes the significant functional relationship among numerous local components in normal period. Second, we will use this causality graph as a propagation template to predict the system status by iteratively applying the current system event signatures to it. Finally, we will compute an anomaly score by using this predicted system event signature.

Uncover Causal Relations Via Non-Negative Sparse Regression

We discuss how to transform the multiple event sequences into the input of a series of regression problems, in order to identify the temporal causality relation among the different events. The idea is to predict (or reconstruct) the occurrence of the one event by using other events that happen before it. More precisely, considering predicting the occurrence of the ith event using all other j event where 1<j<D; j not equal to i. Then we are able to generate a number of ni pairs, (X(i)_j, Y(i)_j), where X(i)_j is an D-1 dimensional vector, Y(i)_j is a scalar, $$Y_j^{(i)} = e_j^{(i)} \quad (2)$$

$$X_j^{(i)}[d] = \sum_{t_l^{(d)} \in [t_j^{(i)} - \Delta t, t_j^{(i)}]} f(e_l^{(d)}) \quad (3)$$

Figure 4:
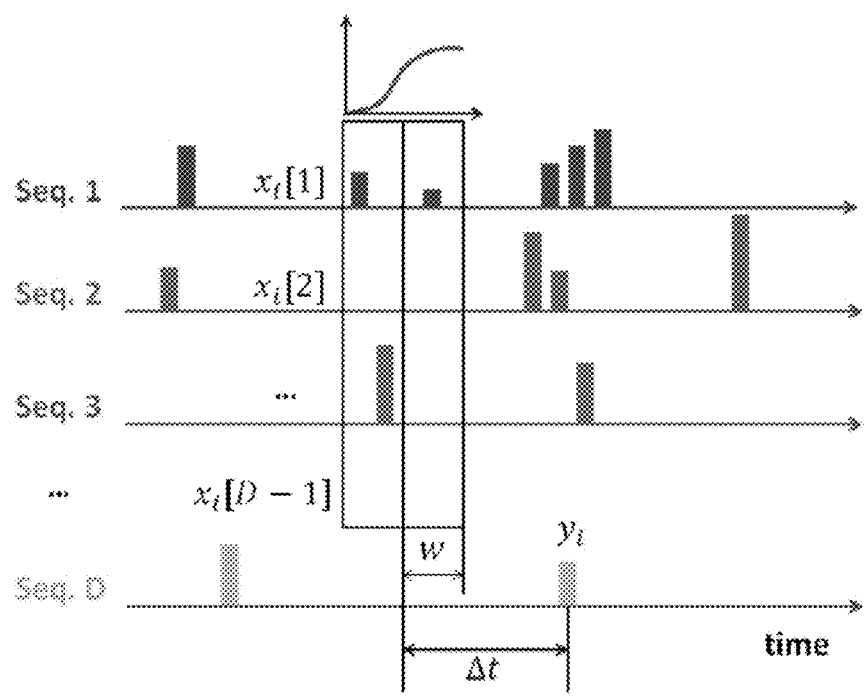
FIG. 4 illustrates one approach to transform the event sequence into regression data.

FIG. 4 illustrates one approach to transform the event sequence into regression data. In order to combine the several time stamps together for each event channel, we use a time-based re-weighting scheme to compute a weighted average of the event counts in each channel. Then we can define the following regression problem to uncover the relation between $$\min \|X^{(i)} \cdot \alpha^{(i)} - Y^{(i)}\|_2^2 + \lambda \cdot |\alpha^{(i)}| \quad (4)$$

$$\text{s.t.} \quad \alpha^{(i)} \geq 0 \quad (5)$$

By regressing each event sequence with all the rest sequences, and repeating this for every sequence, one can obtain D model coefficients, each containing D-1 regression coefficients. Since these coefficients are all non-negative, we can transform these coefficients into a graph. Specifically, a matrix W that is a D-by-D matrix.

Event Propagation on the Causal Graph

The Temporal Causality Graph W summarizes the relation among all the D events. The edge weights in this graph describe exactly the transition of the system event signature from the time stamp t−Δt to time stamp t. Therefore, given the system event signature at any future time t, we can predict the system signature in the next time stamp as $$v(t+\Delta t) = a \cdot W \cdot v(t) + (1-a) \cdot v(t) \quad (6)$$

Similarly, if one wants to predict several steps ahead, one can iteratively apply the above equation. In case one wants to propagate infinite steps, the converged signature will be Anomaly Detection The temporal causal graph can be used to identify the status of the system, which is usually composed of multiple components whose inter-relation can shed important light on the system behavior. Suppose we have used the historical event sequences in the normal period to build the causality graph W. In the real-time testing phase, suppose we have the event signature v(t) is D-1 dimensional vector, for any given time t. Then we can compute the anomaly score of for the event signature vt by examining whether the co-occurrence patterns in v(t) can be found in W. If all the co-occurrence patterns can be found in W, then the event signature v(t) will be deemed as normal; on the contrary, if most of the co-occurrence patterns in v(t) are absent in W, then v(t) is supposed to contain abnormal patterns. In the following we propose two ways to compute the anomaly scores.

Figure 5:
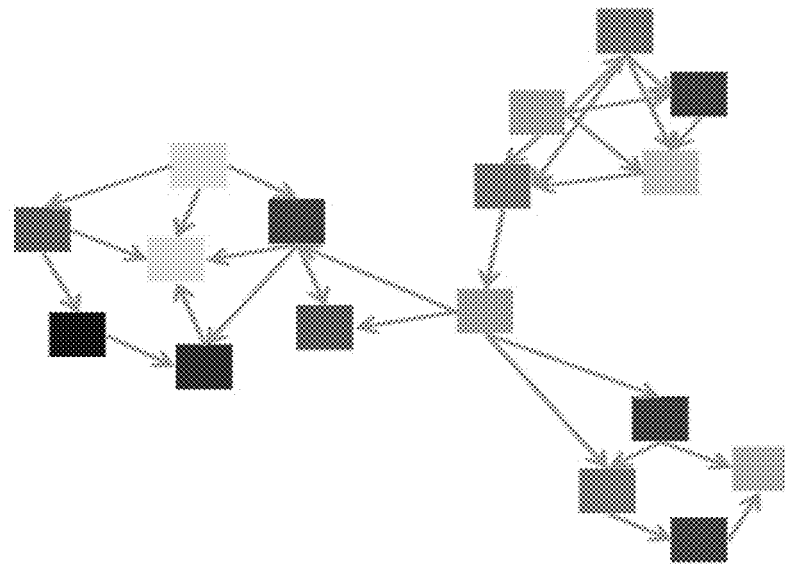
FIG. 5 shows an exemplary directed graph that summarizes the temporal causality relations among different events.

FIG. 5 shows an exemplary directed graph that summarizes the temporal causality relations among different events. Each node is an event, and if Wij>0, then there exists an edge between the i and jth node with weight Wij.

Anomaly Score by Unseen Co-Occurrence Patterns

More specifically, we can compute the anomaly score for v(t) as $$s(t) = \frac{\sum_{i,j} g(W_{ij}) v(t)_{ij}}{\sum_{i,j} (1 - g(W_{ij})) v(t)_{ij}} \quad (8)$$

Here g( ) is defined as a decaying function, such as the Gaussian kernel function or a step function. Intuitively, the score measures the ratio between the unseen co-occurrence patterns in v(t) and those consistent with the patterns in the graph W. The higher the score, the more anomalous v(t) is.

Anomaly Score by Path Distances on Graph

The second method is to compute the pairwise distances of the non-zero events in v(t) on the directed graph defined by W. If a pair of events (ie one co-occurrence pattern) is far away from each other on the graph (in terms of the shortest path distance), then this pattern will be highly anomalous and should contribute to the level of anomaly. More specifically, one can define $$s(t) = \sum_{v(t)_{ij} > 0} dis(i, j \mid W) \quad (9)$$

$$dis(i, j \mid W) = \begin{cases} \text{shortest-path-}dis & \text{there exists path between } i, j \\ e & \text{no path between } i, j \end{cases} \quad (10)$$

Threshold for Alarms

In order to define a threshold of the anomaly scores such that an alarm can be triggered, one can examine the distribution of the historical signature event vectors v(t)'s fort=1; 2; . . . T. By assuming that the anomaly score follows a Gaussian distribution, one can easily compute the threshold of the scores corresponding to, say, a 5% quantile.

Figure 6:
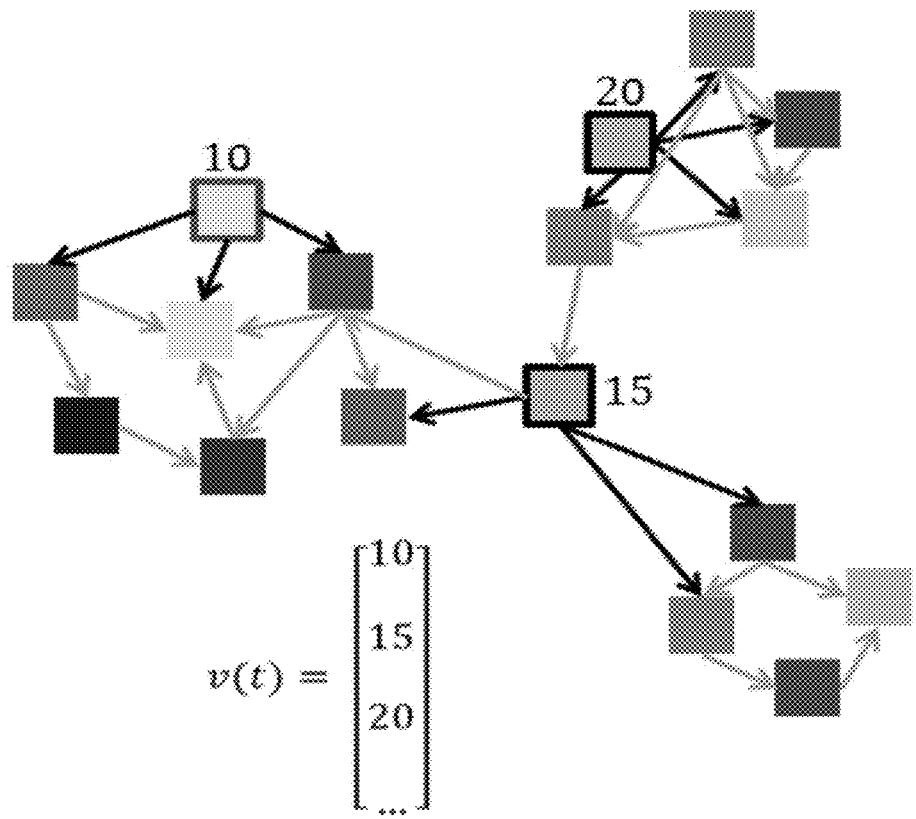
FIG. 6 illustrates an exemplary directed graph that summarizes the temporal causality relations among different events.

FIG. 6 illustrates an exemplary directed graph that summarizes the temporal causality relations among different events. Each node is an event, and if Wij>0, then there exists an edge between the i and jth node with weight Wij.

Figure 7:
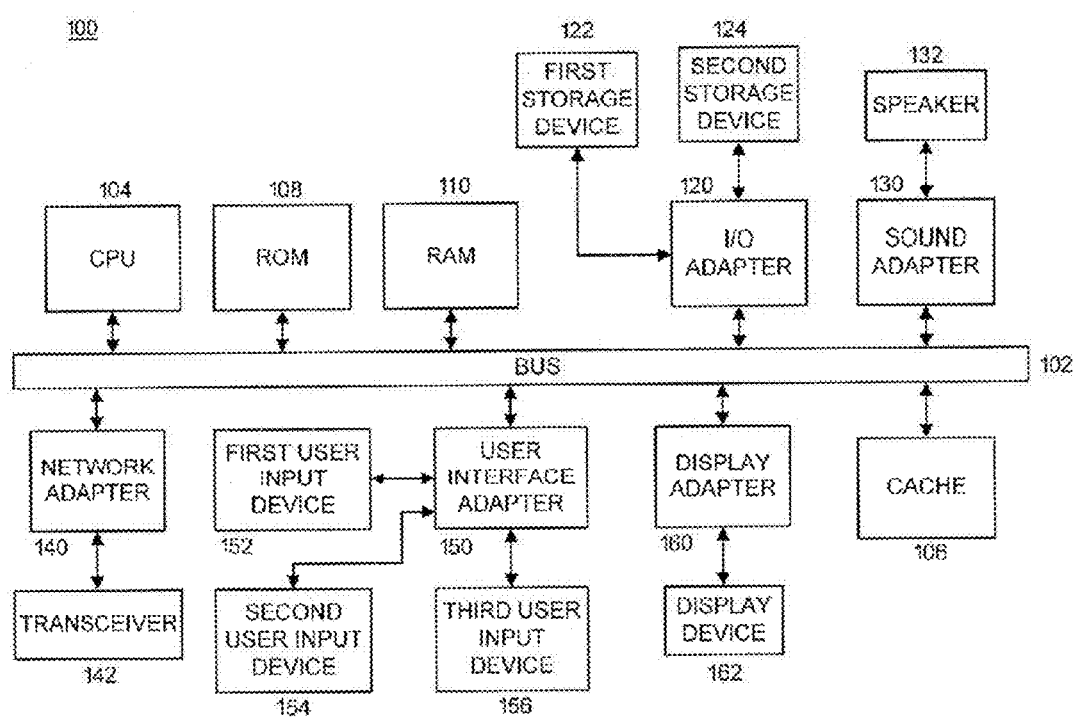
FIG. 7 shows an exemplary computer system for detecting anomalies.

Referring to the drawings in which like numerals represent the same or similar elements and initially to FIG. 7, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The system of FIG. 7 can be connected to the Internet, a global system of interconnected computers and computer networks that use a standard Internet protocol suite (e.g., the Transmission Control Protocol (TCP) and Internet Protocol (IP)) to communicate with each other. The Internet of Things (IoT) allows objects, not just computers and computer networks, to be readable, recognizable, locatable, addressable, and controllable via an IoT communications network (e.g., an ad-hoc system or the Internet). The system can be used in various applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines. For these IoT or industrial systems, the detection of one or more anomalies in the IoT system includes building a temporal causality graph describing functional relationship among local components in normal period; applying the causality graph as a propagation template to predict a system status by iteratively applying current system event signatures; and detecting the one or more anomalies of the system by examining related patterns on the template causality graph that specifies normal system behaviors. The system can aligning event patterns on the causality graph to determine an anomaly score.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for detecting one or more anomalies in a system, comprising building a temporal causality graph describing functional relationship among local components in normal period;

applying the temporal causality graph as a propagation template to predict a system status by iteratively applying current system event signatures by predicting the occurrence of one event by using other events that occur before it according to the following relationship $$Y_j^{(i)} = e_j^{(i)}$$

$$X_j^{(i)}[d] = \sum_{t_l^{(d)} \in [t_j^{(i)} - \Delta t, t_j^{(i)}]} f(e_l^{(d)})$$

which defines predicting an occurrence of an ith event using other j events where $1 \le j < D$; j not equal to i and generating a number of n_i pairs, (X(i)_j, Y(i)_j), where X(i)_j is an D-1 dimensional vector, Y(i)_j is a scalar;

combining several time stamps together for an event channel, applying a time-based re-weighting scheme to determine a weighted average of event counts in an event channel, and applying regression to determine a relation:

$$\min \|X^{(i)} \cdot \alpha^{(i)} - Y^{(i)}\|_2^2 + \lambda \cdot |\alpha^{(i)}|$$

$$\text{s.t.} \quad \alpha^{(i)} \ge 0;$$

determining an anomaly score for v(t) as $$s(t) = \frac{\sum_{ij} g(W_{ij}) v(t)_{ij}}{\sum_{ij} (1 - g(W_{ij})) v(t)_{ij}} \quad (8)$$

where g( ) is defined as a decaying function; and detecting the one or more anomalies of the system by examining related patterns on the temporal causality graph that specifies normal system behaviors.

2. The method of claim 1, comprising sensors part of an internet of things (IoT), digital networking system or cloud.

3. The method of claim 1, comprising determining an anomaly score by using a predicted system event.

4. The method of claim 1, wherein the building of the temporal causality graph comprises performing a non-negative sparse regression.

5. The method of claim 1, comprising using the graph to describe normal system behaviors and then detecting anomaly based on the temporal causality graph as a template.

6. The method of claim 1, wherein the temporal causality graph is determined using a non-negative LASSO (least absolute shrinkage and selection operator).

7. The method of claim 1, wherein a combination of causal inference and anomaly detection is used to identify a system failure.

8. The method of claim 1, comprising analyzing discrete event sequences.

9. The method of claim 1, comprising determining Causal Relations with Non-negative Sparse Regression.

10. The method of claim 1, comprising transforming multiple event sequences into an input of a series of regression problems to identify a temporal causality relation among different events.

11. The method of claim 1, comprising determining an anomaly score for v(t) as pairwise distances of non-zero events in v(t) on a directed graph.

12. The method of claim 1, comprising aligning event patterns on the temporal causality graph to determine an anomaly score.

13. The method of claim 1, comprising performing event propagation on the temporal causality graph to predict a future status.

* * * * *